United States Patent
Eskandry

(10) Patent No.: US 6,179,038 B1
(45) Date of Patent: Jan. 30, 2001

(54) PIVOTING AUTOMOBILE WINDOW SHADES

(76) Inventor: Ezra D. Eskandry, 1925 Brickell Ave., D901, Miami, FL (US) 33129

(*) Notice: Under 35 U.S.C. 154(b), the term of this patent shall be extended for 0 days.

(21) Appl. No.: 09/413,617

(22) Filed: Oct. 6, 1999

(51) Int. Cl.$^7$ .................................................. B60J 3/00
(52) U.S. Cl. ............................... 160/370.21; 296/97.8
(58) Field of Search ........................ 160/370.21, 370.23, 160/351, 354; 296/97.1, 97.6, 97.7, 97.8

(56) References Cited

U.S. PATENT DOCUMENTS

| | | | |
|---|---|---|---|
| 1,898,276 | * 2/1933 | Dresser | 296/97.1 |
| 4,332,414 | 6/1982 | Surtin | 296/97.7 |
| 4,606,572 | 8/1986 | Maguire | 296/97.7 |
| 4,681,149 | 7/1987 | Tung-Chow | 160/134 |
| 4,815,784 | 3/1989 | Zheng | 296/97.7 |
| 4,861,090 | 8/1989 | Gavrieli | 160/134 |
| 5,015,027 | * 5/1991 | Rifaat | 296/97.8 |
| 5,024,262 | 6/1991 | Huang | 160/370.2 |
| 5,035,460 | 7/1991 | Huang | 296/95.1 |
| 5,116,273 | 5/1992 | Chan | 160/370.21 |
| 5,213,147 | 5/1993 | Zheng | 160/370.21 |
| 5,267,599 | * 12/1993 | Kim | 160/370.23 |
| 5,379,822 | * 1/1995 | Lenetz | 160/370.21 |
| 5,452,934 | 9/1995 | Zheng | 296/97.7 |
| 5,553,908 | * 9/1996 | Shink | 160/370.21 |
| 5,575,324 | 11/1996 | Hwang | 160/370.21 |
| 5,598,883 | 2/1997 | Platsis | 160/370.23 |
| 5,628,357 | 5/1997 | Hwang | 160/370.21 |
| 5,632,318 | 5/1997 | Wang | 160/370.21 |
| 5,687,786 | 11/1997 | Tsai et al. | 160/370.21 |
| 5,732,759 | 3/1998 | Wang | 160/370.21 |
| 5,785,106 | 7/1998 | Hwang | 160/370.21 |
| 5,845,697 | 12/1998 | Zheng | 160/370.21 |
| 5,941,265 | 8/1999 | Zheng | 135/125 |

FOREIGN PATENT DOCUMENTS

| | | | |
|---|---|---|---|
| 320991 | * 5/1957 | (CH) | 296/97.6 |
| 634739 | * 2/1962 | (IT) | 296/97.8 |
| 8909706 | * 10/1989 | (WO) | 296/97.8 |

* cited by examiner

Primary Examiner—Blair M. Johnson
(74) Attorney, Agent, or Firm—Robert C. Kain, Jr.

(57) ABSTRACT

The automobile window shade system is adapted to be removably mounted at an interior of an automobile window. The automobile window shade system of the present invention includes a plurality of shades and each shade includes a web of shade material and a continuous loop spring mounted therewith. Preferably, the spring material is sewn within the web of shade material. A plurality of pivots rotatably link adjacent shades together such that the plurality of shades has a fully extended longitudinal position or mode and a compact stacked position or mode wherein respective continuous loop springs are substantially vertically aligned in the stacked position. In the stacked position, the plurality of shades may be twisted and folded to form a sub-compact, twisted and folded position or mode. In the sub-compact mode, the entire shade can be placed in a bag or can be wrapped with an elastic strap to maintain the sub-compact positional mode. Additional features include longitudinally extending web material at the end shades, systems for attaching laterally facing edges of adjacent shades when those shades are in the fully extended longitudinal position or mode, and a pivot support plate in each shade in order to provide a substantially planar web of shade material. To enhance the utility of the automobile shade, the front side of the shade may carry either advertising indicia or emergency indicia (e.g., "Help", "Call Police," "Need Gas").

53 Claims, 8 Drawing Sheets

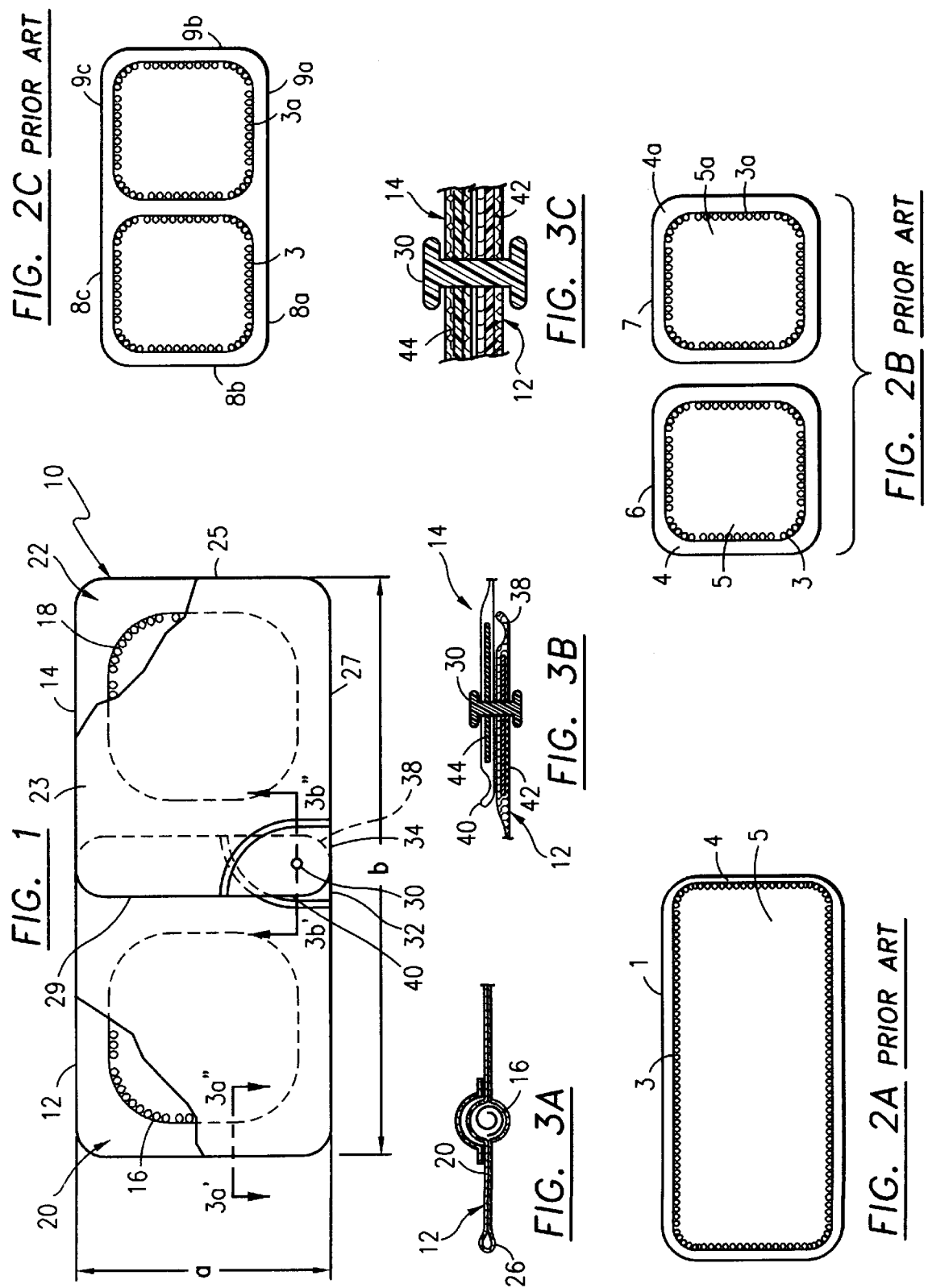

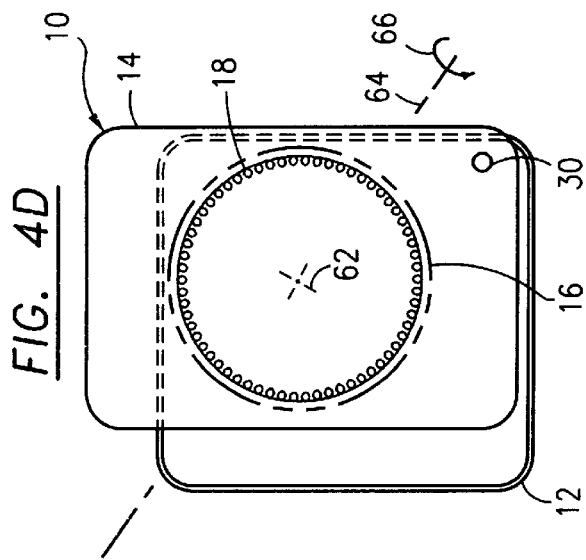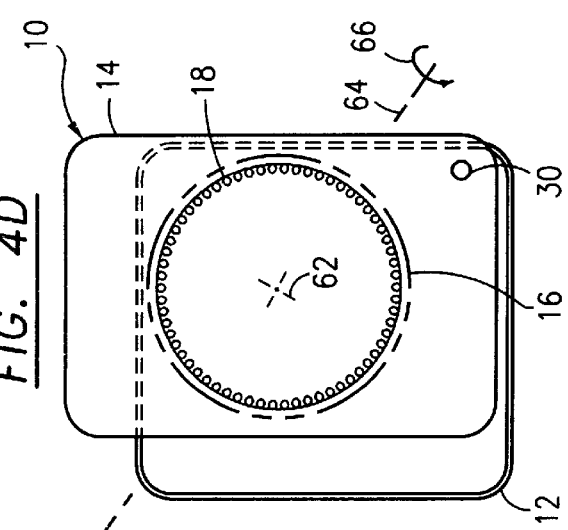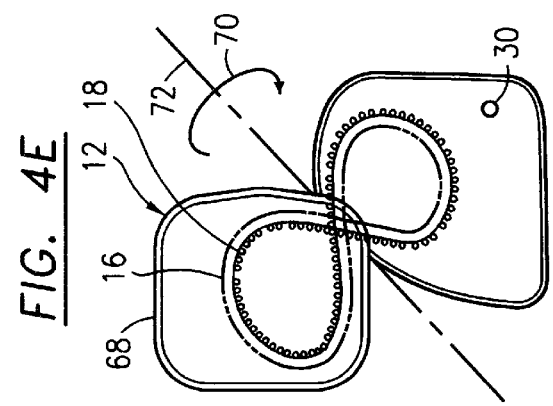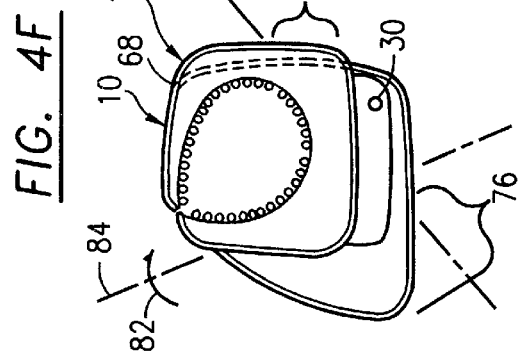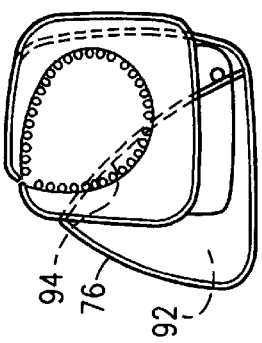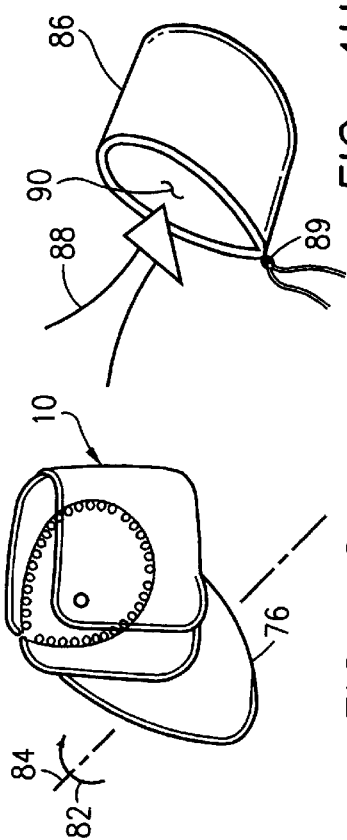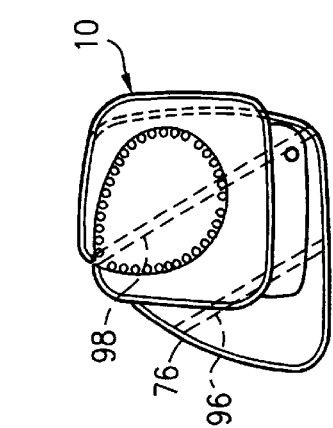

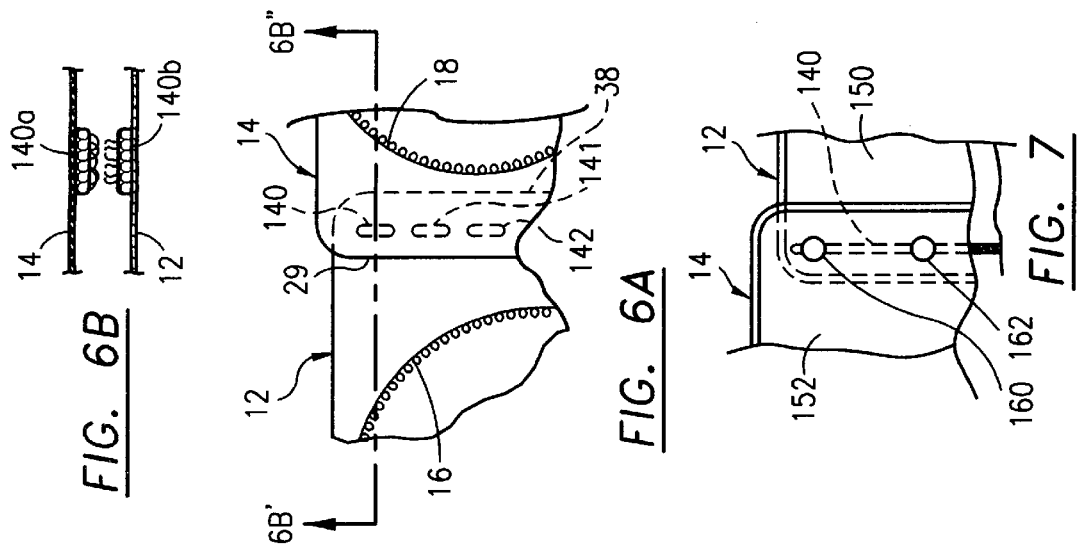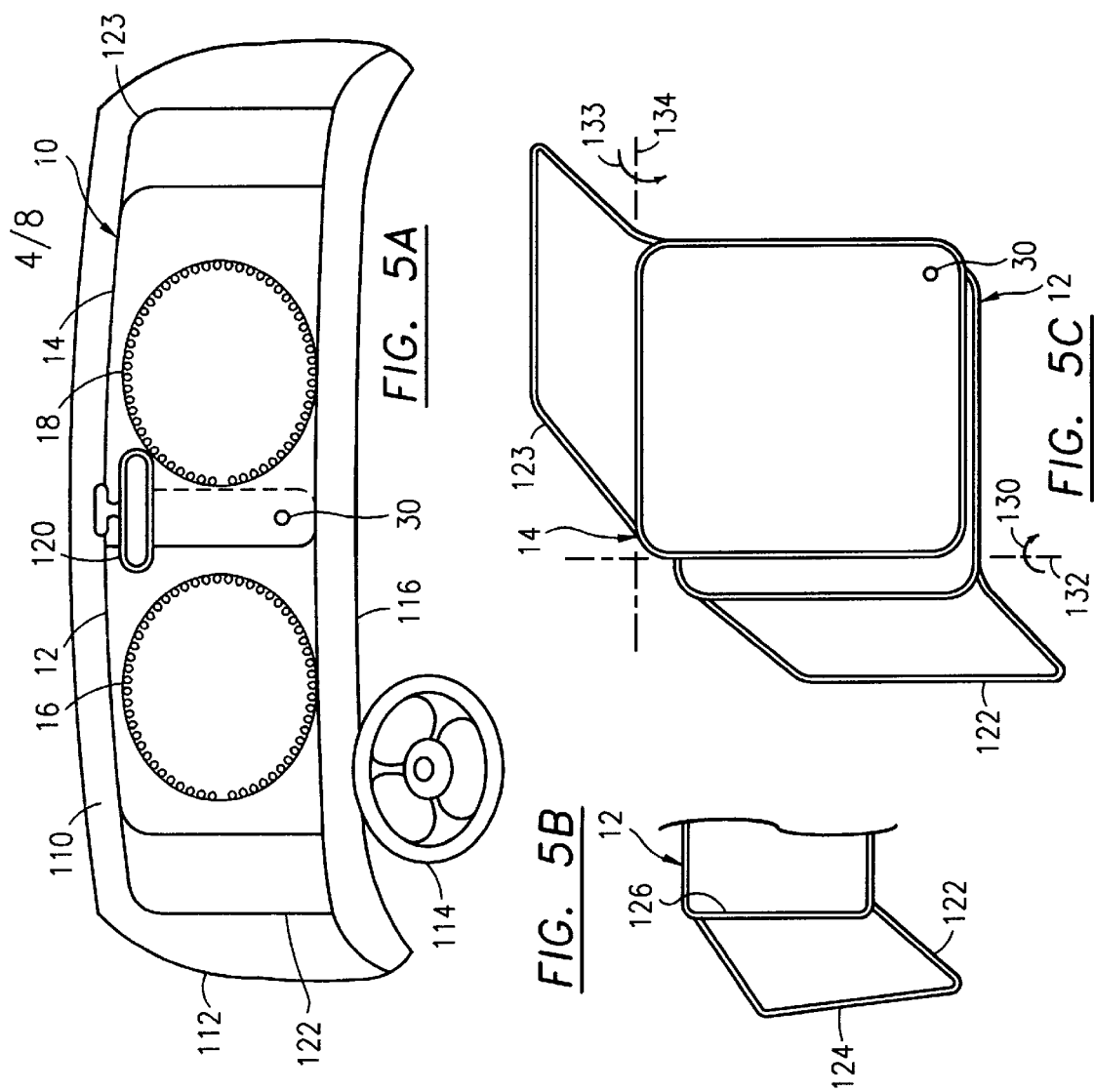

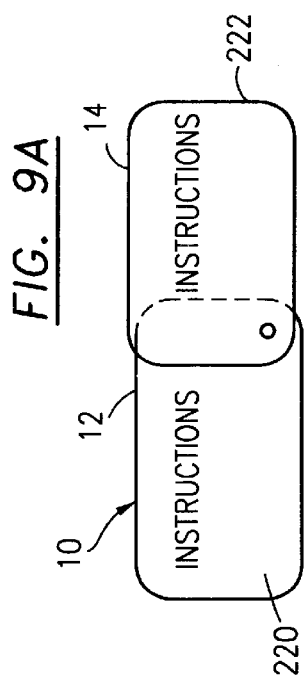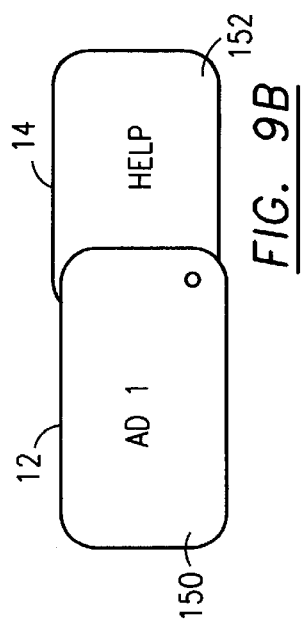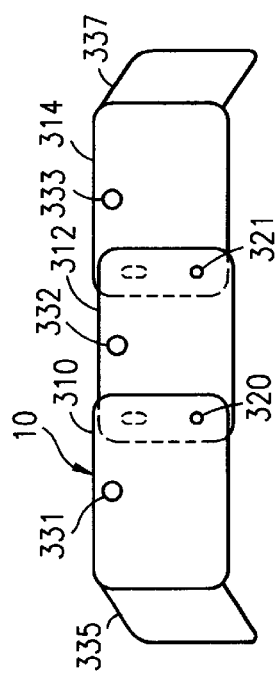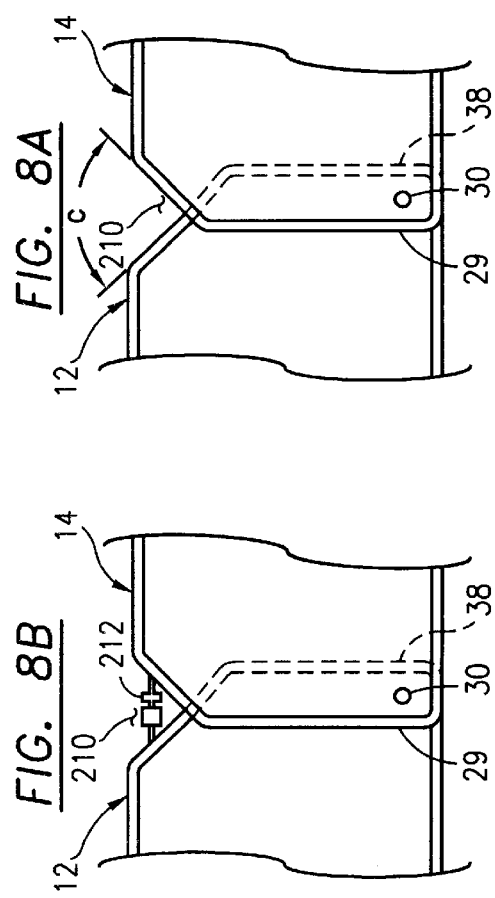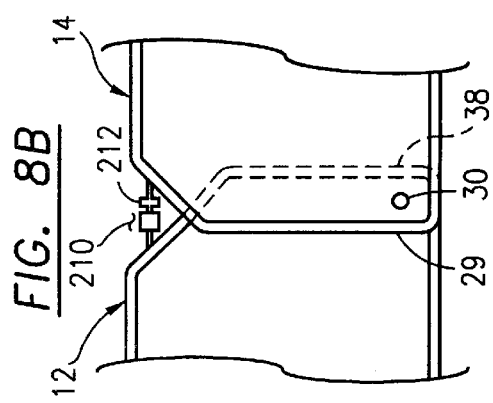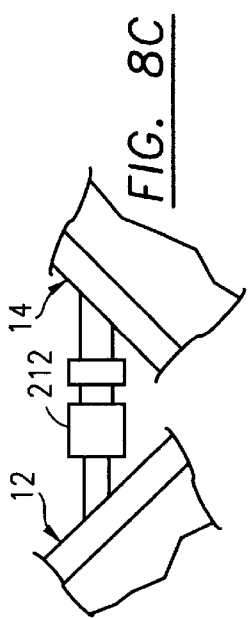

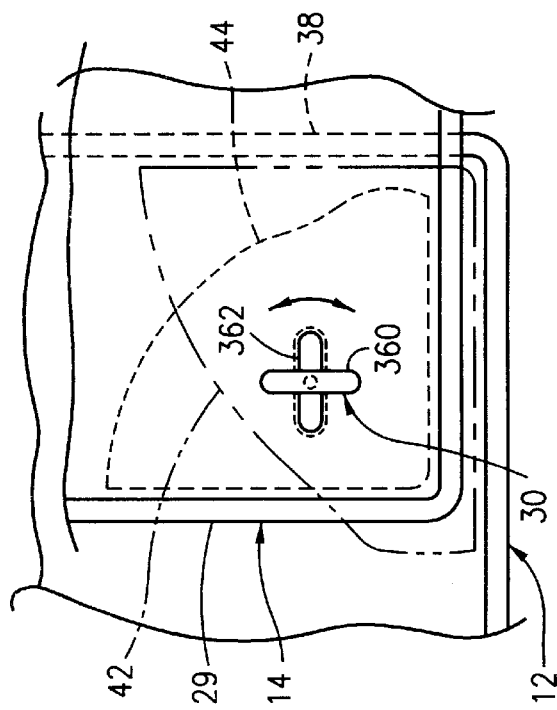
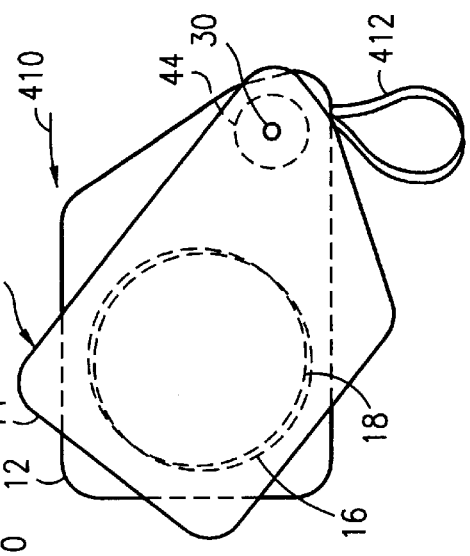
FIG. 11
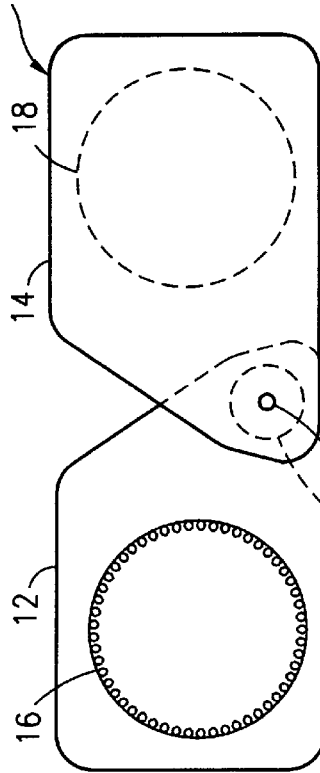
FIG. 12A
FIG. 12B

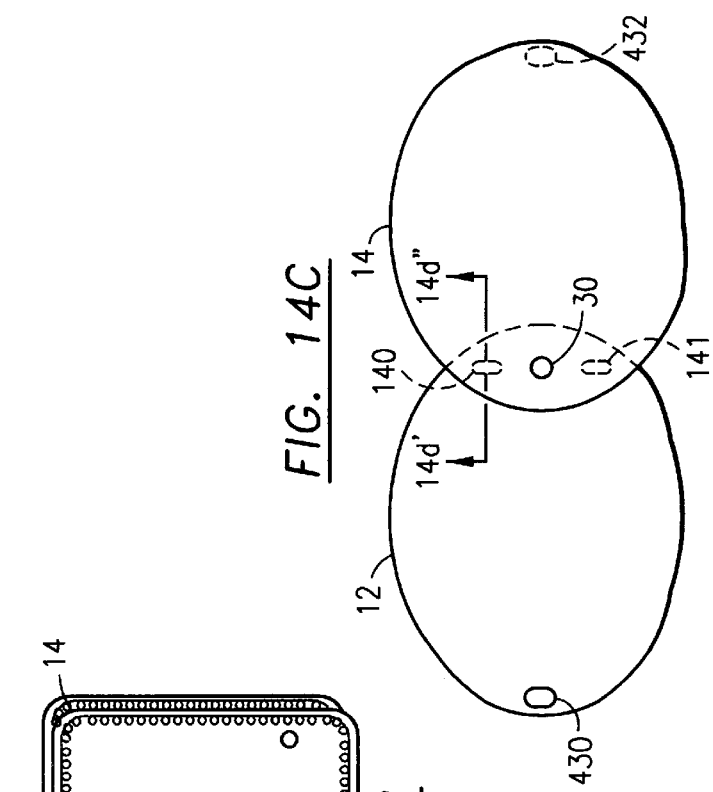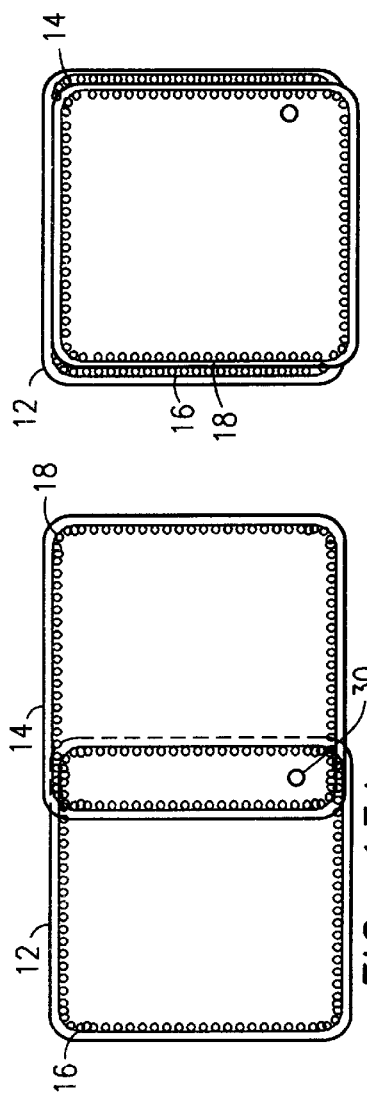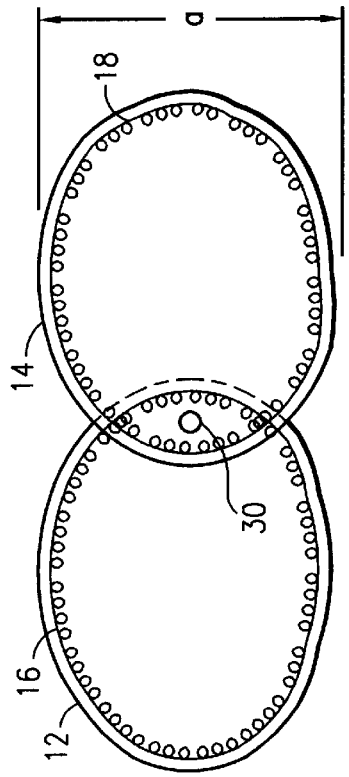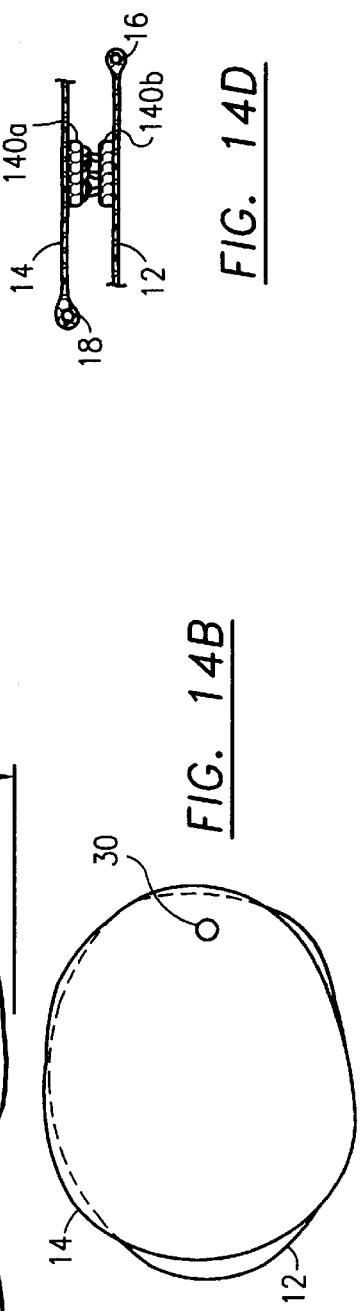

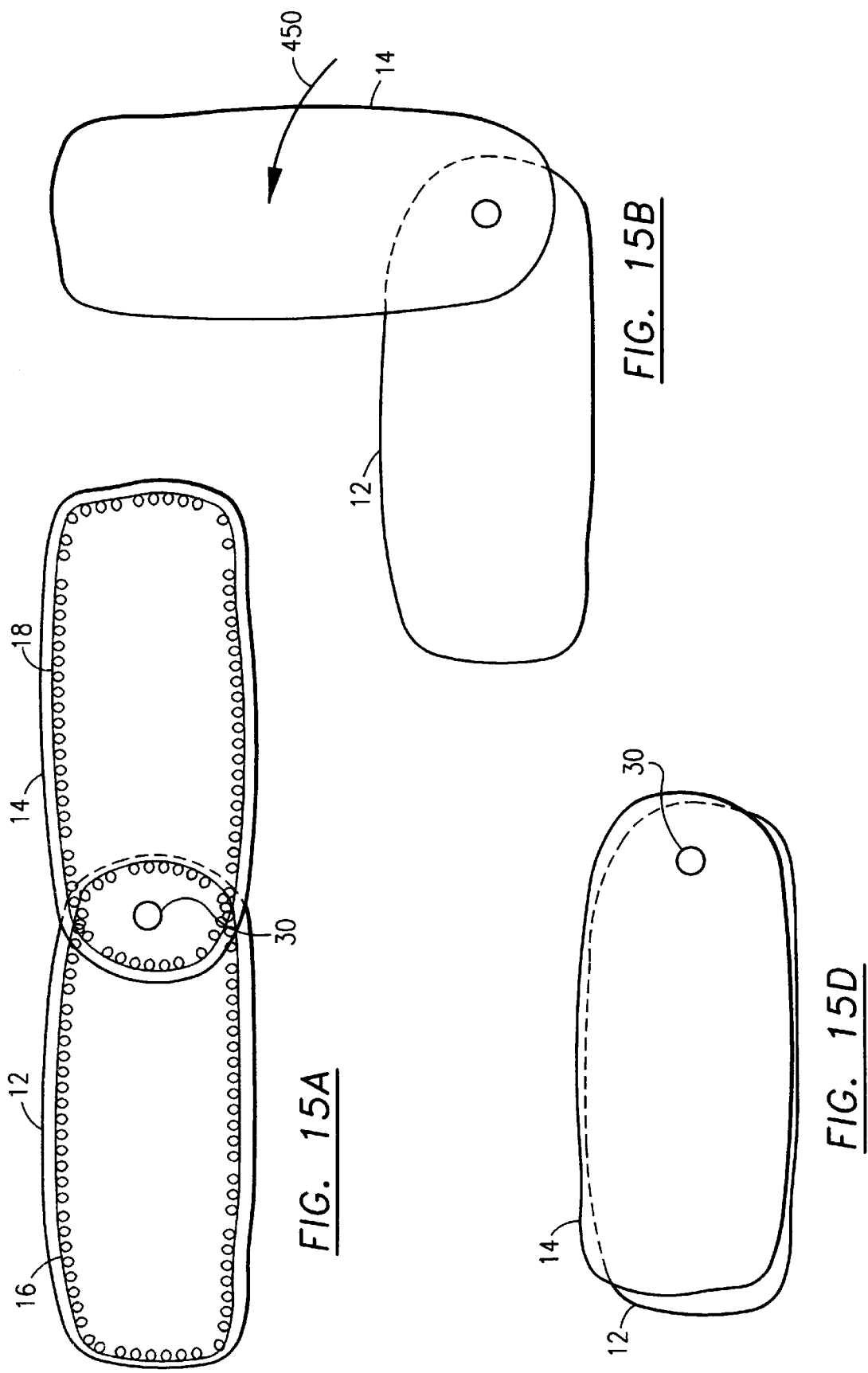

PIVOTING AUTOMOBILE WINDOW SHADES

The present invention relates to pivoting automobile window shades system that is removably mounted at an interior of an automobile window.

BACKGROUND OF THE INVENTION

Automobile window shades are utilized to reflect, and sometimes to absorb (in the winter months), sunlight that filters through an automobile window.

One automobile window shade utilizes a web of material having a continuous loop spring mounted along its periphery. The size of this prior art automobile shade is generally equivalent to the size of a front window of an automobile.

Another prior art automobile window shade utilizes two, completely independent, window shades. Each of these prior art window shades (used in combination), include a web of shade material and a continuous loop spring mounted along the periphery of each independent shade. To use these shades, the user unfolds the shade from a twisted, folded configuration and independently places the first and the second shade in his or her automobile window.

OBJECTS OF THE PRESENT INVENTION

It is an object of the present invention to provide an automobile window shade system which includes a plurality of shades which are pivotally linked together.

It is another object of the present invention to provide end shades having longitudinally extending flaps.

It is a further of the present invention to provide an automobile window shade system, formed of a plurality of shades pivotally mounted together, wherein the pivotally mounted shades can be folded and stacked vertically atop each other such that respective continuous loop springs in each shade web are vertically aligned and when the vertically aligned and stacked loop springs are twisted and folded, the shade has three positional modes, that is, a fully laterally extending positional mode (fully deployed in the automobile), a compact stacked positional mode and a sub-compact, twisted and folded positional mode.

It is a further object of the present invention to provide various attachment mechanisms to attach the non-pivoted lateral side edges of the plurality of shades together.

It is a further object of the present invention to provide a pivot which also is a latch to release adjacent shades from each other.

It is a further object of the present invention to provide automobile window shades which are square shaped, rectangular shaped, circular shaped and oblong shaped.

BRIEF DESCRIPTION OF THE DRAWINGS

Further objects and advantages of the present invention can be found in the detailed description of the preferred embodiments when taken in conjunction with the accompanying drawings in which:

FIG. 1 diagrammatically illustrates an automobile window shade system in accordance with the principles of the present invention;

FIGS. 2A, 2B and 2C diagrammatically illustrate prior art or preexisting automobile window shades;

FIGS. 3A and 3B diagrammatically illustrate broken away, cross-sectional views of an automobile window shade system in accordance with the principles of the present invention from the perspective of section lines 3a'–3a" and 3b'–3b" in FIG. 1;

FIG. 3C diagrammatically illustrates a detailed view of the pivot for the shade system in FIGS. 1 and 3B;

FIGS. 4D, 4E, 4F, 4G diagrammatically illustrate various operational modes terminating in a twisted and folded sub-compact positional mode (FIG. 4G);

FIGS. 4H, 4I and 4J diagrammatically illustrate systems for packaging and maintaining the automobile window shade system in the sub-compact, twisted and folded positional mode utilizing an independent bag, a bag attached to the outside of one of the shade webs and one or more elastic straps, respectively;

FIG. 5A diagrammatically illustrates the automobile window shade system mounted at an interior of an automobile window;

FIGS. 5B and 5C diagrammatically illustrate a longitudinal extender flap and the folding procedure for those extenders, respectively;

FIGS. 6A and 6B diagrammatically illustrate one type of attachment for lateral edges for the window shades and a detail of a cloth hook and loop (VELCRO) attachment from the perspective of section line 6b'–6b" in FIG. 6A, respectively;

FIG. 7 diagrammatically illustrates the utilization of suction cups to mount the longitudinally extended automobile window shade system in the automobile window shown in FIG. 5A;

FIGS. 8A, 8B and 8C diagrammatically illustrate a V-shaped cutout formed by the combination of two shades at lateral facing edges, a means for attaching the lateral edges of those two adjacent shades and a detail of one type of attachment;

FIGS. 9A and 9B diagrammatically illustrate an inboard and an outboard surface of the automobile window shade system in a fully extended longitudinal position providing instructions for the shade's use and indicia for advertising and/or automobile emergencies;

FIGS. 10A and 10B diagrammatically illustrate the automobile window shade system configured as a three shade set consisting of pivotally attached shade webs and the utilization of longitudinal extender flaps on end shades (with suction cups);

FIG. 11 diagrammatically illustrates a pivot which also includes a latch to release one shade from an adjacent shade;

FIGS. 12A and 12B diagrammatically illustrate a pair of automobile window shades formed as an irregular rectangular shape but still adapted to vertically align respective continuous loop springs in either shade web (FIG. 12B);

FIGS. 13A and 13B diagrammatically illustrate square shades having peripherally deployed continuous loop springs wherein the shades are pivotally mounted to each other;

FIGS. 14A and 14B diagrammatically illustrate generally circular or oblong shaped web shades with generally peripheral continuous loop springs mounted thereon to enable vertical stacking and an illustrated stacked positional mode;

FIGS. 14C and 14D diagrammatically illustrate round shades with a pivot point inboard of the continuous loop springs and the utilization of a VELCRO attachment for the fully extended longitudinal position mode and the compact stacked position mode; and FIGS. 15A, 15B and 15C diagrammatically illustrate the automobile window shade system of the invention with a rectangular shape.

SUMMARY OF THE INVENTION

Figure 4A:
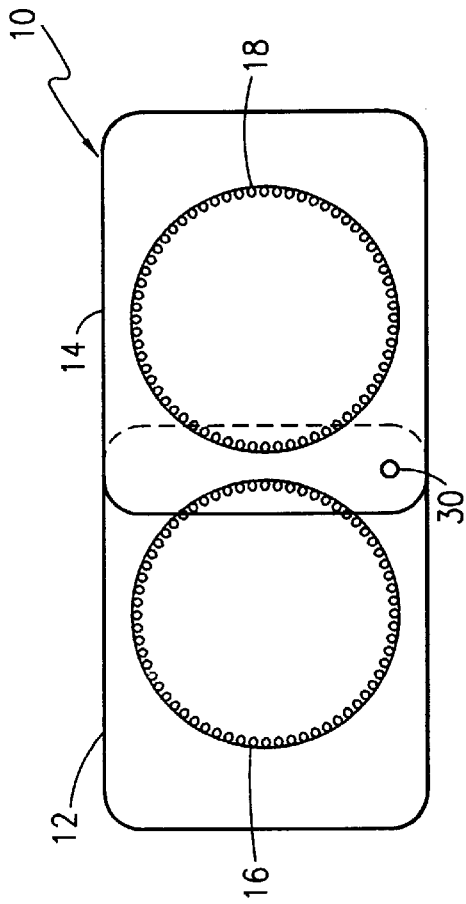
FIGS. 4A, 4B and 4C diagrammatically illustrate an automobile window shade system in a fully extended longitudinal positional mode, an intermediate positional mode and a compact, stacked positional mode wherein the continuous loop springs in each shade web are substantially vertically aligned.

The automobile window shade system is adapted to be removably mounted at an interior of an automobile window. The automobile window shade system of the present invention includes a plurality of shades and each shade includes a web of shade material and a continuous loop spring mounted therewith. Preferably, the spring material is sewn within the web of shade material. A plurality of pivots rotatably link adjacent shades together such that the plurality of shades has a fully extended longitudinal position or mode and a compact stacked position or mode wherein respective continuous loop springs are substantially vertically aligned in the stacked position. In the stacked position, the plurality of shades may be twisted and folded to form a sub-compact, twisted and folded position or mode. In the sub-compact mode, the entire shade can be placed in a bag or can be wrapped with an elastic strap to maintain the sub-compact positional mode. Additional features include longitudinally extending web material at the end shades, systems for attaching laterally facing edges of adjacent shades when those shades are in the fully extended longitudinal position or mode, and a pivot support plate in each shade in order to provide a substantially planar web of shade material. To enhance the utility of the automobile shade system, the front side of the shade may carry either advertising indicia or emergency indicia (e.g., "Help", "Call Police", "Need Gas").

DETAILED DESCRIPTION OF THE PREFERRED EMBODIMENTS

The present invention relates to an automobile window shade system which includes a plurality of shades pivotally mounted together.

FIG. 1 diagrammatically illustrates automobile window shade system 10 including shade 12 and shade 14. Shade 12 and shade 14 include a respective continuous loop springs 16, 18 mounted therein. Preferably, the continuous loop springs are sewn into the web material 20, 22 of shades 12, 14. In the illustrated embodiment, web material 20, 22 includes outboard portions which are radially beyond loop springs 16, 18. For example, with respect to shade 14, web 22 includes outboard shade material 23, 25, 27 and 29. As used herein, the term "outboard" refers to items radially beyond the periphery of continuous loop springs 16, 18. The term "inboard" refers to items inside the periphery of loop spring 16, 18. Similar numeral designate similar items throughout the drawings.

The Continuous Loop Spring Table set forth below identifies spring systems which are considered to be "continuous loop spring" within the scope and spirit of the present invention.

| Continuous Loop Spring Table |
|---|
| square |
| circular |
| oval |
| elliptical |
| rectangular |

FIGS. 2A, 2B and 2C diagrammatically illustrate prior art or preexisting automobile window shades. Spring shade 1 in FIG. 2A includes a continuous loop spring 3 sewn into a peripheral region 4 of web material 5. In FIG. 2B, prior art or preexisting automobile window shades 6, 7 are completely independent of each other. The user can position spring shades 6, 7 together or apart and even on different automobile windows. Spring shades 6, 7 also include web shade material 5, 5a and continuous loop springs 3, 3a which are sewn into peripheral regions 4, 4a of the respective window shades 6, 7. FIG. 2C illustrates prior art or preexisting spring shade 1 with two (2) continuous loop springs 3, 3a sewn into peripheral shade edge segments 8a, 8b and 8c, for spring 3 and segments 9a, 9b and 9c for spring 3a.

FIG. 3A diagrammatically illustrates a broken away, cross-sectional view of the automobile shade in accordance with the principles of the present invention from the perspective of a portion of section line 3a'–3a" in FIG. 1. Shade system 12 is made, in the illustrated embodiment, of a single sheet of shade webbing having a sewn, bead edge 26 and a continuous loop spring 16 sewn or mounted onto shade web 20.

FIG. 3B diagrammatically illustrates the pivot linking shades 12 and 14. Shades 12 and 14 have a pivot 30 mounted in corner region 32 of shade 12 and mounted in the laterally facing corner region 34 of shade 14. As use herein, the term "lateral" refers to items spanning distance a in FIG. 1. In contrast, the term "longitudinal" refers to items spanning distance b in FIG. 1. Corners 32, 34 laterally face each other because corner 32 is closely associated with lateral edge 38 of shade 12. Corner 34 is closely associated with lateral edge 40 of shade 14. As shown in FIG. 1, lateral edge region 40 covers lateral edge region 38 of shade 12.

Referring to FIG. 3B, in order to enhance the structural integrity of pivot 30 and ensure that shade 14 rotatably moves over the substantially planar shade web 20 of shade 12, the pivot has pivot support plates 42, 44. Preferably, pivot support plates 42, 44 are sewn in shade webs 20, 22. FIG. 3B also shows edge beads 38 and 40 for shades 12, 14. By including pivot support plates 42, 44, the operator can easily swing and rotate shade 14 over shade 12.

FIG. 3C diagrammatically illustrates a detail view of pivot 30, pivot support plates 42, 44 and upper and lower web materials for shades 12, 14.

The following Shade Material Table provides some examples of the type of material which may be utilized in the present invention for the automobile window shades.

| Shade Material Table |
| --- |
| nylon or similar & synthetic material (various colors) |
| black interior and silver or reflective exterior on nylon or similar synthetic material |
| silver or reflective quilted material mesh |

One of the important features of the present invention is the utilization of pivots to permit the user to laterally extend the plurality of web shades to a maximum degree and, in a different storage mode, to stack the web shades in order to vertically align the continuous loop springs. FIGS. 4A through 4F diagrammatically illustrate the various positional aspects of the present invention including a fully extended longitudinal position for the shade system, a compact stacked position and a twisted and folded sub-compact position.

FIG. 4A diagrammatically illustrates window shade system 10 wherein web shades 12, 14 are longitudinally extended thereby covering a substantial portion of an automobile window. The automobile window is shown in FIG. 5A.

Figure 4C:
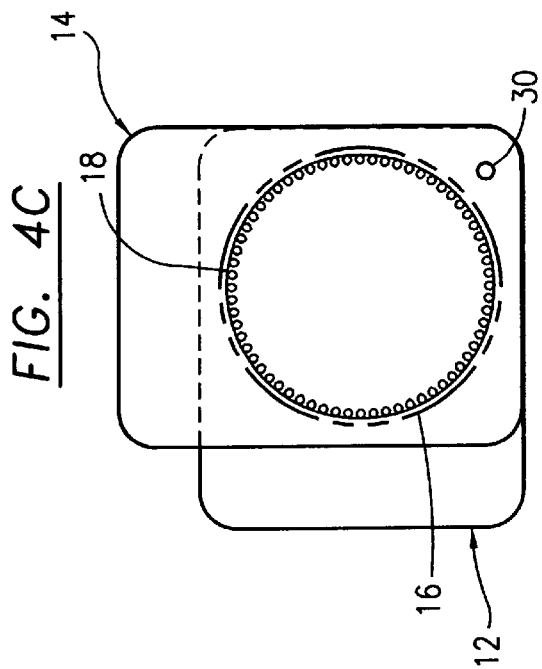
Figure 4B:
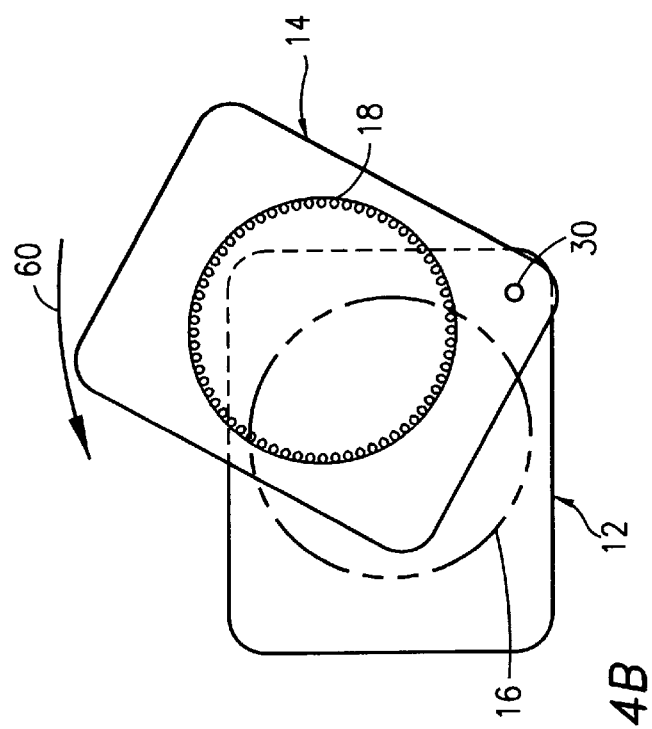

In FIG. 4B, shade 14 is rotated as shown by arrow 60 and shade 14 pivots about pivot 30 over shade 12.

In FIG. 4C, continuous loop springs 16, 18 are substantially vertically aligned and shade 14 is stacked on shade 12. This figure diagrammatically illustrates the compact stacked positional mode of the present invention. The fully extended, longitudinal positional mode is shown in FIG. 4A.

FIG. 4D illustrates a double edge line for the edges of shade 12 and a single edge line for the edges of shade 14. The respective continuous loop spring in shade 12 is shown with a long dash and short dash line. The continuous loop spring 18 mounted within or on shade 14 is shown as a coil loop. Center point 62 is identified in the central region of the vertically aligned and stacked springs 16, 18. In order to further store automobile window shade system 10, the user bends stacked springs 16, 18 over dividing line 64 and in the direction of arrow 66.

FIG. 4E shows that the user has twisted loop springs 16–18 such that shade 12 is substantially visible and hides shade 14. To achieve the sub-compact folded mode, the user rotates composite shade portion 68 in the direction shown by arrow 70 over dividing line 72.

FIG. 4F diagrammatically illustrates the twisted, folded, sub-compact mode for shade system 10. Portion 68 of shade 12 is visible to the user. Excess web material in region 74 and in region 76 can be folded as shown by arrow 78 over dividing line 80 and as shown by arrow 82 over dividing line 84.

FIG. 4G shows that the user can fold excess web flap 76 in the direction shown by arrow 82 over line 84 thereby again folding the automobile window shade system into a very compact shape.

FIG. 4H diagrammatically shows an independent pouch 86 within which can be placed the twisted, folded and sub-compact shape automobile window shade system 10 as shown in the direction by arrow 88. A draw string 89 permits the user to cinch the opening 90 of the pouch or bag.

FIG. 4I diagrammatically illustrates that excess web flap 76 may include a pouch 92. Pouch 92 is formed on the underside of flap 76. Bead edge 94 of pouch 92 is diagrammatically illustrated in FIG. 4I.

FIG. 4J shows that excess web flap 76 may include one or more elastic straps 96, 98 which may be wrapped or bound around the twisted, sub-compact shape of shade system 10.

FIG. 5A diagrammatically illustrates automobile window shade system 10 in a fully extended, longitudinal mode in which shade 14 fully longitudinally extends from shade 12. Shades 12, 14 are disposed at an interior 110 of an automobile window 112. In the illustrated embodiment, automobile window 112 is the front window of an automobile. Steering wheel 114 and dashboard 116 are diagrammatically illustrated in FIG. 5A. One method to mount window shade system 10 in the interior of automobile window 112 is to rest the inboard side of shade system 10 next to rear view mirror 120. As used herein, the term "inboard" refers to a position further inside the automobile as compared to items outside or exterior to the automobile. In other words, dashboard 116 is generally considered to be outboard with respect to wheel 114.

FIG. 5B shows automobile window shade web 12 has a longitudinal extender flap 122. In FIG. 5A, longitudinal extender flap 122 permits the user to extend shade 12 to cover additional longitudinal portions of window 112. Edge beads 124 enable the user to place extender flap 112 at a generally vertical position in automobile window 112. In FIG. 5B, edge bead 126 of shade web 12 is diagrammatically illustrated.

FIG. 5A also shows web shade 14 having a longitudinal extender flap 123.

FIG. 5C shows that web shade 14 has been rotatably moved about pivot point 30 to be vertically stacked over web shade 12. Although not illustrated, the continuous loop springs 16, 18 are vertically stacked atop each other as diagrammatically illustrated in FIG. 4C. In other words, FIG. 4C shows automobile window shades 12, 14 without longitudinal extender flaps whereas FIG. 5C diagrammatically shows web shades 12, 14 with longitudinal extender flaps 122, 123. The user flips or folds flap 122 in a direction shown by arrow 130 over dividing line 132. The user flips flap 123 as shown by arrow 133 over divider line 134.

FIG. 6A diagrammatically shows a plurality of edge attachments 140, 141, 142 which enable the user to further attach lateral facing edges near lateral edges 29, 38 of web shades 12, 14. Loop springs 16, 18 are also illustrated in FIG. 6A.

FIG. 6B diagrammatically shows attachment mechanism as a cloth hook and loop (VELCRO) fastener structure. Strip or spot loop attachments are shown as loop fasteners 140a. Cloth hooks are shown as complimentary fasteners 140b.

FIG. 7 diagrammatically illustrates web shades 12, 14 and particularly outer faces 150, 152. FIG. 7 shows that suction cups 160, 162 are mounted on outboard face 152 of web shade 14. Alternatively, one or more suction cups could be mounted on outboard face 150 of shade 12. FIG. 7 also shows a lateral edge region fastener system 140 as a strip.

FIG. 8A diagrammatically illustrates web shade 12, 14 having laterally facing edges 29, 38 forming, in combination with each other, a V-shaped cutout 210. V-shaped cutouts span angle c. V-shaped cutout 210 enables the user to easily place automobile shade system 10 at an outboard position with respect with rear view mirror 120 in FIG. 5A.

FIG. 8B diagrammatically illustrates a shade attachment mechanism 212 disposed in V-shaped cutout 210. As used herein, the term "V-shaped" includes U-shapes and rotated C-shapes and generally concave shaped cutouts or structural formations which achieve the functionality described above in connection with FIG. 8A. Shade attachment 212 is a means for attaching laterally facing edges. In this embodiment, a clip 212 is diagrammatically illustrated in FIGS. 8B and 8C. However, rather than a clip 212, a cloth hook and loop system could be utilized, tie strings or straps, buttons, hooks or other items. The Shade Attachment Table set forth below provides some examples of such attachments.

| Shade Attachment Table |
|---|
| cloth hook and loop (VELCRO) fastener systems (strips or spots) tie strings or straps, buttons, hooks, clasp systems loop extending and latching onto a button or hook snaps |

FIGS. 9A and 9B diagrammatically illustrate shade system 10 and web shades 12, 14 having interior surfaces 220, 222. In order to inform the user, instructions or instructional indicia is imprinted on inboard or interior surfaces 220, 222 of web shades 12, 14.

FIG. 9B diagrammatically illustrates shades 12, 14 and particularly outboard or outer surfaces 150, 152. Shade surface 150 has imprinted thereon an advertisement. Shade surface 152 has an emergency sign imprinted thereon. Typical examples of emergency signs include the following: "HELP," "CALL POLICE," "NEED GAS," "MEDICAL EMERGENCY," "HAZARD," "DANGER."

Emergency indicia assist the driver or other occupant of the automobile. Advertising indicia assist companies in specifically identified company cars as compared to non-company or vendor automobiles.

FIG. 10A diagrammatically illustrates an automobile window shade system 10 having three web shades 310, 312 and 314. Each web shade includes a respective continuous loop spring 316, 317, 318. Adjacent web shades 310,312 are joined together by pivot 320. Adjacent shades 312,314 are rotatably joined together by pivot 321. In op and the vertically stacked sub-system consisting of web shades 314, 312 is rotated as shown by arrow 324 until continuous loop springs 316, 317, 318 are substantially vertically aligned. In the vertically aligned position, window shade system 10 shown in FIG. 10A achieves substantially the same structural system as shown in FIG. 4D above. In other words, the three shade system shown in FIG. 10A can be twisted and folded as shown with respect to the two shade system and in the sequential illustrations of FIGS. 4D, 4E and 4F.

FIG. 10B diagrammatically shows the outer surfaces of web shades 310, 312 and 314. These shades include suction cups 331, 332 and 333.

End shades 312, 314 of the three shade set include longitudinal flaps 335, 337. In this manner, the three shade system consisting of web shades 310,312 and 314 and includes longitudinal end flap extenders 335, 337 which operate in substantially the similar manner as that shown in connection with the two shade system of web shades 12, 14 in FIG. 5A above.

FIG. 11 diagrammatically illustrates a special pivot 30 which provides a latch to release shade 14 from shade 12. Specifically, pivot 30 includes a rotatable lag or bar 360 which is substantially the same size as a button hole or a cutout 362. When lag or bar 360 is normal to or not co-planar with cutout 362, shade 12 is pivotally attached to shade 14. When lag or bar 360 is co-planar with cutout 362, shade 14 can be removed or withdrawn by pulling shade 14 away from shade 12 in a direction normal to the substantially planar web shape of the shade.

FIG. 11 additionally shows pivot support plates 42, 44 closely associated with the corners of lateral facing edges 29, 38 of web shades 12, 14.

FIG. 12A shows that web shades 12, 14 may be shaped as an irregular rectangle. An important feature is that continuous loop spring 16 has substantially the same shape as continuous loop 18 in the adjacent shade 14.

In FIG. 12B, shade 14 has been rotated as shown by arrow 410 such that loop spring 18 is vertically stacked atop loop spring 16.

Also, FIGS. 12A and 12B show an elastic loop 412 which may be utilized to maintain the shade system 10 in a sub-compact form. The sub-compact form of a shade is shown in FIG. 4F.

FIGS. 13A and 13B diagrammatically show square shaped web shades 12, 14. Also, pivot point 30 is disposed inboard of loop springs 16, 18. The extended portions in FIG. 13B of web shades 12, 14 still enable twisting and sub-compacting of the vertically aligned loop springs 16, 18. Slight misalignment between loop springs 16, 18 do not prohibit twisting (from FIG. 4D to FIG. 4E) and folding from (FIG. 4E to FIG. 4F) of window shades system 10. FIGS. 14A and 14B diagrammatically show shades 12, 14 in a circular shape or an oblong shape. Pivot point 30 is rotated at a lateral mid-region approximately one half lateral distance a. As shown in FIG. 14B, shade 12 is stacked atop shade 14 thereby achieving substantial vertical alignment of the continuous loop springs 16, 18 not shown in FIG. 14B but shown in FIG. 14A.

FIG. 14C diagrammatically shows circular web shades 12, 14 rotatably linked via pivot 30. Additionally, spot fasteners 140, 141 are placed above or below or laterally spaced apart pivot point 30. As discussed above, pivot 30 is inboard the periphery of spring loops 16, 18. In addition, web shades 12, 14 in FIG. 14C include additional fasteners systems 430, 432. These additional fasteners 430,432 enable shades 12, 14 to be vertically stacked atop each other similar to that shown in FIG. 4C above.

FIG. 14D diagrammatically shows a broken away detailed view of the fastener system 140. In the illustrated embodiment, a cloth hook and loop fastener system consisting of loops 140a and hooks 140b is shown. Continuous loop springs 16, 18 for web shades 12, 14 are also diagrammatically illustrated in FIG. 14D.

FIG. 15A diagrammatically illustrates web shades 12, 14 as rectangle or oblong shapes. Pivot 30 is disposed at an inboard position relative to peripherally mounted continuous loop springs 16 and 18 for web shades 12, 14. FIG. 15B shown an intermediate position of shade 14 relative to shade 12 when the user is rotating shade 14 in the direction shown by arrow 450. FIG. 15C shows vertical stacking of rectangular shades 12, 14 atop each other.

The claims appended hereto are meant to cover modifications and changes within the scope and spirit of the present invention.

What is claimed is:

1. An automobile window shade system adapted to be removably mounted at an interior of an automobile window comprising:

a plurality of shades, each shade including a web of shade material and a continuous loop spring mounted thereon, each shade being substantially planar as defined by the respective continuous loop spring; and, at least one pivot, positioned normal with respect to said substantially planar shades, rotatably linking adjacent shades such that said plurality of shades have a fully extended positional mode and a compact stacked positional mode, respective continuous loop springs being substantially vertically aligned in said stacked positional mode.

2. An automobile window shade system as claimed in claim 1 wherein said plurality of shades is two shades rotatable linked together with a single pivot.

3. An automobile window shade system as claimed in claim 2 wherein said web material for at least one shade of said plurality of shades extends outboard of said respective continuous loop spring.

4. An automobile window shade system as claimed in claim 3 wherein said at least one shade has one of a square and a rectangular shape.

5. An automobile window shade system as claimed in claim 4 wherein said plurality of shades have web material extending outboard from said respective continuous loop spring and said plurality of shades have one of a square and a rectangular shape.

6. An automobile window shade system as claimed in claim 5 wherein said plurality of shades have a square shape.

7. An automobile window shade system as claimed in claim 6 wherein each said shade has a longitudinal aspect and a lateral aspect, said longitudinal aspect for said plurality of shades being the largest dimension in said fully extended position, said plurality of shades having at least one end shade, said one end shade having a longitudinal extender flap opposite the respective pivot attaching said one end shade to the corresponding adjacent shade.

8. An automobile window shade system as claimed in claim 7 wherein said plurality of shades is two shades and each shade includes a respective longitudinal extender flap opposite the pivot attaching said two shades together.

9. An automobile window shade system as claimed in claim 8 wherein said two shades have lateral facing edges which, in combination, form a V-shaped cut-out.

10. An automobile window shade system as claimed in claim 9 including means for attaching lateral facing edges of said two shades together when said shades are in said fully extended positional mode.

11. An automobile window shade system as claimed in claim 10 wherein when said shades, in said compact stacked positional mode and said continuous loop springs are vertically aligned, are twisty and foldable onto themselves and form a subcompact, twisted and folded positional mode.

12. An automobile window shade system as claimed in claim 11 including a bag for containing said shades when in said subcompact, twisted and folded positional mode.

13. An automobile window shade system as claimed in claim 12 wherein said pivot is located in a corner of a respective web forming the corresponding shade.

14. An automobile window shade system as claimed in claim 13 wherein said pivot is disposed in a corresponding edge region of a respective shade outboard of the respective continuous loop spring, each shade including a pivot support plate mounted thereon.

15. An automobile window shade system as claimed in claim 12 wherein said pivot is located inboard of the respective continuous loop spring and in a lateral mid-region of the corresponding shade.

16. An automobile window shade system as claimed in claim 14 including suction cups adapted to removably mount said shades onto said automobile window.

17. An automobile window shade system as claimed in claim 16 wherein said shades include a front side and a rear side, said front side adapted to be adjacent said interior of said automobile window and said front side carrying one of advertising indicia and emergency indicia.

18. An automobile window shade system as claimed in claim 17 wherein said pivot includes a latch to release one shade from the other shade.

19. An automobile window shade system as claimed in claim 1 wherein at least one shade has one of a square, a rectangular, a circular and an oblong shape.

20. An automobile window shade system as claimed in claim 1 wherein said plurality of shades have web material extending outboard from said respective continuous loop springs and said plurality of shades have one of a square, a rectangular, a circular and an oblong shape.

21. An automobile window shade system as claimed in claim 20 wherein each of said plurality of shades has substantially the same shape.

22. An automobile window shade system as claimed in claim 1 wherein each shade of said plurality of shades has a square shape.

23. An automobile window shade system as claimed in claim 22 wherein each said shade has a longitudinal aspect and a lateral aspect, said longitudinal aspect for said plurality of shades being the largest dimension in said fully extended position, said plurality of shades having at least one end shade, said one end shade having a longitudinal extender flap opposite the respective pivot attaching said one end shade to the corresponding adjacent shade.

24. An automobile window shade system as claimed in claim 1 wherein said plurality of shades is a two shade set, and each shade includes a respective longitudinal extender flap opposite the pivot attaching said two shades together.

25. An automobile window shade system as claimed in claim 22 wherein each shade has a longitudinal aspect and a lateral aspect, said longitudinal aspect for said plurality of shades being the largest dimension in said fully extended position, each shade set having a first and a second longitudinal end shade, said end shades having a respective longitudinal extender flap opposite the corresponding pivot attaching said end shade to the adjacent shade.

26. An automobile window shade system as claimed in claim 1 wherein said plurality of shades define two shades which have lateral facing edges and which, in combination, form a V-shaped cut-out.

27. An automobile window shade system as claimed in claim 1 wherein each shade has a longitudinal aspect and a lateral aspect, said longitudinal aspect for said plurality of shades being the largest dimension in said fully extended position, including means for attaching lateral facing edges of respective adjacent shades together when said respective adjacent shades are in said fully extended positional mode.

28. An automobile window shade system as claimed in claim 1 wherein when said plurality of shades are in said compact stacked positional mode and said respective continuous loop springs are vertically aligned, are twisty and foldable onto themselves and form a subcompact, twisted and folded positional mode.

29. An automobile window shade system as claimed in claim 24 wherein when said shade set is in said compact stacked positional mode and said respective continuous loop springs are vertically aligned, are twisty and foldable onto themselves and form a subcompact, twisted and folded positional mode.

30. An automobile window shade system as claimed in claim 29 including a bag for containing said shades when in said subcompact, twisted and folded positional mode.

31. An automobile window shade system as claimed in claim 28 including a bag elastic strap for containing said shades when in said subcompact, twisted and folded positional mode.

32. An automobile window shade system as claimed in claim 1 wherein each said pivot is located in a corner of a respective web forming the corresponding shade.

33. An automobile window shade system as claimed in claim 32 wherein each said pivot is disposed in a corresponding edge region of a respective shade outboard of the respective continuous loop spring, each shade including a pivot support plate mounted thereon.

34. An automobile window shade system as claimed in claim 1 wherein each said pivot is located inboard of the respective continuous loop spring and in a lateral mid-region of the corresponding shade.

35. An automobile window shade system as claimed in claim 1 including suction cups adapted to removably mount said shades onto said automobile window.

36. An automobile window shade system as claimed in claim 1 wherein said pivot includes a latch to release adjacent shades from each other.

37. An automobile window shade system as claimed in claim 29 wherein said pivot includes a latch to release adjacent shades from each other.

38. An automobile window shade system as claimed in claim 11 including an elastic strap for retaining said shades when in said subcompact, twisted and folded positional mode.

39. An automobile window shade system as claimed in claim 29 including an elastic strap for retaining said shades when in said subcompact, twisted and folded positional mode.

40. An automobile window shade system as claimed in claim 28 including an elastic strap for retaining said shades when in said subcompact, twisted and folded positional mode.---53.

41. An automobile window shade system as claimed in claim 1 corners1 wherein said plurality of shades is a three shade set, said three shade set having a central shade and two outboard shades, and wherein said outboard shades each include a respective longitudinal extender flap opposite the respective pivot attaching said outboard shades to said central shade.

42. An automobile window shade system adapted to be removably mounted at an interior of an automobile window comprising:

plural shade members, each of said shade members including a continuous loop spring connected to and supporting a web of shade material within the interior of a loop formed by said continuous loop spring, each of said shade members being substantially planar as defined by the respective continuous loop spring;

a pivot connection between said shade members, said pivot connection positioned normal with respect to said substantially planar shade members, said pivot connection interconnecting said shade members such that said shade members may be arranged in a fully extended position substantially adjacent each other for covering a major portion of said automobile window and in a compact stacked position wherein said shade members substantially overlap each other and are operable to be twisted and folded onto themselves to form a twisted and folded position for storing said window shade, said continuous loop springs in said fully extended position of said shade being of a configuration such as to be deployed at said interior of said automobile window without forcibly engaging a frame of said automobile window in such a way as to deflect or deform said continuous loop springs, respectively.

43. An automobile window shade system as claimed in claim 42 wherein:

said shade members each include a flap of web material extending along at least one lateral side outboard of said continuous loop spring so as to shade portions of opposed edges of said automobile window not covered by the portion of said shade members, respectively, inboard of said continuous loop springs.

44. An automobile shade system as claimed in claim 43 wherein:

said shade members each include a flap of web material outboard of said continuous loop spring and extending along at least one of a top and bottom longitudinal side of said shade member.

45. An automobile window shade system as claimed in claim 42 wherein:

said pivot connection between said shade member is disposed inboard of said continuous loop springs, respectively.

46. The automobile window shade system as claimed in claim 42 wherein:

said pivot connection includes a pivot support plate mounted on each shade member, respectively.

47. The automobile window shade system as claimed in claim 42 wherein:

each of said shade members has a generally rectangular shape.

48. An automobile window shade system as claimed in claim 47 wherein:

each of said shade members has a sloping edge of a side of said shade member facing the other shade member to form a generally V-shaped notch between said shade members in said fully extended position.

49. An automobile window shade system as claimed in claim 48 including:

a shade attachment mechanism disposed on said shade members for attaching said facing edges to each other at a point spaced from said pivot connection.

50. An automobile window shade system as claimed in claim 48 wherein:

said attachment mechanism comprises cooperating hook and loop fastener members on said shade members, respectively.

51. An automobile window shade system adapted to be removably mounted at an interior of an automobile window comprising:

two interconnected shade members, each of said shade members including a continuous loop spring which is of one of a substantially rectangular and square shape in an untwisted position, each of said continuous loop spring connected to and supporting a web of shade material within the interior of a loop formed by said continuous loop spring corners, each of said shade members being substantially planar as defined by the respective continuous loop spring;

a pivot connection between said shade members, said pivot connection normal with respect to said substantially planar shade members, said pivot connection interconnecting said shade members such that said shade members may be arranged in a fully extended position substantially adjacent each other and covering a major portion of said automobile window and in a compact stacked position wherein said shade members substantially overlap each other and are operable to be twisted and folded onto themselves to form a twisted and folded position for storing said window shade; and said shade members each including a flap of web material extending along at least one lateral side outboard of said continuous loop springs so as to shade portions of opposed edges of said automobile window not covered by the portions of said shade members, respectively, inboard of said continuous loop springs.

52. The automobile window shade system as claimed in claim 51 wherein:

each of said shade members has a generally rectangular shape.

53. An automobile window shade system as claimed in claim 52 wherein:

each of said shade members has a sloping edge of a side of said shade member facing the other shade member to form a substantially V-shaped notch between said shade members in said fully extended position.

* * * * *